(12) United States Patent
Pan (10) Patent No.: US 7,933,198 B1
(45) Date of Patent: Apr. 26, 2011

(54) VIRTUAL ROUTER FAILOVER DAMPENING

(75) Inventor: Xiaohong Pan, Fremont, CA (US)

(73) Assignee: Foundry Networks, LLC, San Jose, CA (US)

( * ) Notice: Subject to any disclaimer, the term of this patent is extended or adjusted under 35 U.S.C. 154(b) by 328 days.

(21) Appl. No.: 12/130,677

(22) Filed: May 30, 2008

Related U.S. Application Data (60) Provisional application No. 60/932,408, filed on May 30, 2007.

(51) Int. Cl.
*H04L 12/26* (2006.01)

(52) U.S. Cl. ........ 370/219; 370/216; 370/218; 370/220; 370/221; 370/351; 370/357; 709/238

(58) Field of Classification Search ........... 370/401, 370/400, 357, 351, 216, 217, 218, 219, 221; 709/238
See application file for complete search history.

(56) References Cited

U.S. PATENT DOCUMENTS

| | | | |
|---|---|---|---|
| 2002/0184387 A1 | 12/2002 | Yamaya et al. | |
| 2003/0037165 A1 * | 2/2003 | Shinomiya | 709/238 |
| 2004/0085965 A1 | 5/2004 | Fotedar | |
| 2004/0165604 A1 * | 8/2004 | Oh et al. | 370/401 |
| 2004/0240455 A1 | 12/2004 | Shen | |
| 2005/0249113 A1 * | 11/2005 | Kobayashi et al. | 370/219 |
| 2007/0133472 A1 * | 6/2007 | Kim et al. | 370/332 |

OTHER PUBLICATIONS

"BGP Route Flap Damping" Villamizar, et al. Standards Track Nov. 1998, 1-37.
"Virtual Router REdundancy Protocol (VRRP)" Ed. R. Hinden Standards Track Apr. 2004, 1-27.
Cisco IOS Software Releases 12.0 S "IP Event Dampening" http://www.cisco.com/en/US/docs/ios/12_0s/feature/guide/s_ipevdp.html.
ServerIron TrafficWorks L4-7 Configuration Guide Release 10.0.00a Release Date May 10, 2007, Publication Date May 10, 2007. Foundry Networks pp. 8-29-8-44.

* cited by examiner

*Primary Examiner* — William Trost, IV
*Assistant Examiner* — Siming Liu (57) ABSTRACT

A virtual router spans a number of physical routing devices. One of the physical routing devices is designated as master, and the other physical routing devices are designated as backups to the master. A failover protocol that includes both a non-dampened state and a dampened state can be implemented. According to the failover protocol, an attempt to designate one of the backups as master in place of the current master is permitted while the virtual router is in the non-dampened state, while such an attempt is suppressed while the virtual router is in the dampened state.

18 Claims, 4 Drawing Sheets

VIRTUAL ROUTER FAILOVER DAMPENING

RELATED U.S. APPLICATIONS

This application claims priority to the copending provisional patent application Ser. No. 60/932,408, entitled "Virtual Router Redundancy Protocol Dampening and Spanning Multiple LANs," with filing date May 30, 2007, assigned to the assignee of the present application, and hereby incorporated by reference in its entirety.

This application is related to the copending U.S. patent application by X. Pan, Ser. No. 12/130,721, filed on May 30, 2008, entitled "Virtual Router Identifier that Spans Multiple Interfaces in a Routing Device," assigned to the assignee of the present invention, and hereby incorporated by reference in its entirety.

BACKGROUND

A "virtual router" (an abstract representation of two or more physical routers acting as a group) can be used to increase the availability of a default gateway that services a host on a subnet. At any given time, only one of the physical routers (a "first router") is actually routing network traffic for the host; the Internet Protocol (IP) address for the first router serves as the IP address for the virtual router, and the host uses that IP address as its default gateway. If the first router is unable to satisfactorily service the host for some reason, then it can "failover" to another physical router (a "second router") that is spanned by the virtual router.

The Virtual Router Redundancy Protocol (VRRP) is used to assign responsibility for a virtual router to a physical router. According to VRRP, one of the physical routers in the group comprising the virtual router is assigned the highest priority (e.g., a value of 255) and consequently is identified as the owner or master, while the other physical routers in the group are assigned lower priorities and identified as backups. A backup can assume the role of master if the master cannot perform to a satisfactory level. If, for example, an interface (e.g., a port) on the master router (the first physical router) fails, then the priority of the first physical router may be reduced by an amount that corresponds to the loss of that interface. If the first physical router's priority is reduced to less than the priority of the backup router with the next highest priority, then that backup (e.g., the second physical router) becomes the master.

When the failed interface is returned to service, the priority of the first physical router (now a backup) can be increased by the amount by which it had been reduced. If as a result the priority of the first physical router increases to greater than that of the second physical router (the current master), then the first physical router again becomes master and the second physical router again becomes a backup.

An interface may become unstable and "flap" excessively—that is, it may repeatedly and frequently go in and out of service. Each time the interface goes out of service the priority of its physical router will decrease, and each time the interface returns to service, the priority of its physical router will increase. Consequently, the master and backup may repeatedly and frequently swap roles. This type of behavior will persist as long as the interface remains unstable.

SUMMARY

Traffic (e.g., packets) may be dropped while the physical routers transition between their old and new roles. Therefore, it is desirable to reduce the number of such transitions in order to reduce the amount of dropped traffic.

According to embodiments of the present invention, a failover protocol that includes both a non-dampened state and a dampened state can be implemented. According to the failover protocol, an attempt to designate one of the backups as master in place of the current master is permitted when the virtual router is in the non-dampened state, while such an attempt is suppressed when the virtual router is in the dampened state.

In one embodiment, the value of a metric is increased each time there is a failover attempt (whether the attempt is suppressed or not) and decreases with time between failover attempts. The virtual router enters the dampened state if the value of the metric exceeds a first (suppression) threshold value. In another embodiment, the value of the metric cannot exceed a defined maximum value (e.g., a ceiling). In yet another embodiment, the virtual router exits the dampened state and enters the non-dampened state after a prescribed period of time (e.g., the maximum suppression time) that begins after the virtual router enters the dampened state (e.g., after the value of the metric reaches the first threshold value). In another embodiment, the virtual router exits the dampened state and enters the non-dampened state if the value of the metric decreases to less than a second (reuse) threshold value.

As a consequence, the number of times that the master and a backup swap roles is reduced. In particular, a flapping interface will not cause the master and backup to repeatedly swap roles.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "operating," "changing," "yielding," "assuming," "exchanging," "associating," "switching," "designating," "implementing," "attempting," "permitting," "increasing," "decreasing," "monitoring," "checking," "comparing" or the like, refer to the actions and processes of a computer system, or similar electronic computing device (e.g., a routing device such as a router or switch), that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
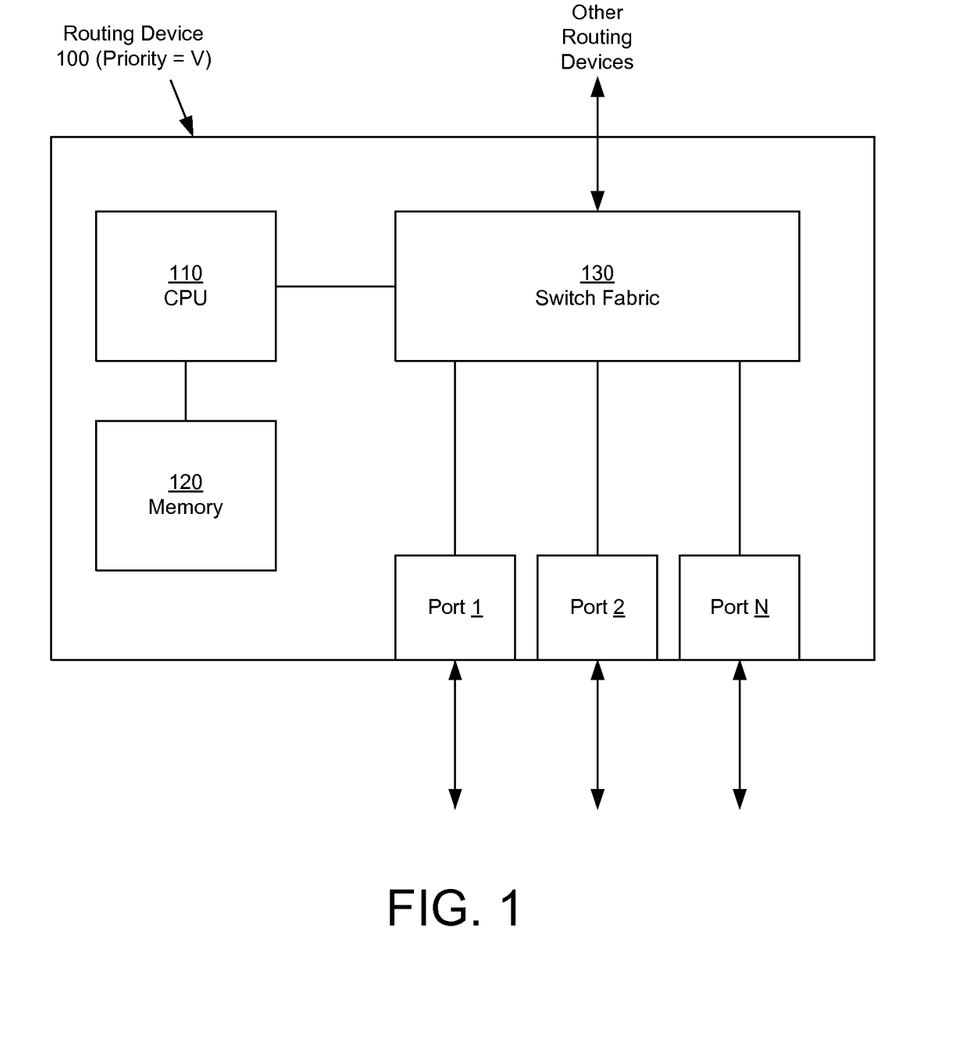
FIG. 1 is a block diagram showing an embodiment of a physical routing device that can be utilized in accordance with the present invention.

FIG. 1 is a block diagram showing selected elements of an embodiment of a physical routing device 100. Generally speaking, the routing device 100 is used to forward packets (data traffic) to its proper destination (e.g., another routing device or an end node). More specifically, the routing device 100 may be a physical router or switch that is coupled to, or is a part of, the Internet or an intranet.

In the example of FIG. 1, the routing device 100 includes a central processing unit (CPU) 110, a memory 120, a switch fabric 130, and a number of ports 1, 2, . . . , N. The ports 1, 2, . . . , N are examples of what may be generally referred to as interfaces. The CPU 110, among its functions, provides hardware management functions, runs network control protocols, and executes the device's operating system. The memory 120, among its functions, stores instructions that can be executed by the CPU 110. The ports 1, 2, . . . , N provide connectivity to the Internet or intranet. The switch fabric 130 interfaces with the ports 1, 2, . . . , N and transfers packets between those ports, and may include packet processors, MAC (e.g., Media Access Control) and PHY (e.g., physical layer) devices, a traffic manager device, switching chips, a backplane and the like, implemented in ASICs (application-specific integrated circuits) and FPGAs (field-programmable gate arrays), and perhaps one or more CPUs operating on instructions stored in a memory. Also, the routing device 100 may be one of a number of routing devices that may be grouped (mounted) in a rack or chassis and that are in communication with one another. If so, the switch fabric 130 also interfaces with and facilitates the transfer of packets between the routing device 100 and those other routing devices. A physical routing device utilized in accordance with embodiments of the present invention can include elements not shown in FIG. 1 or described herein.

According to embodiments of the present invention, a priority value is associated with each interface (e.g., port) 1, 2, . . . , N. Each interface can have a different priority value. Each of the priority values is a user-specified value; in one embodiment, a priority value is in the range of zero (0) to 255 (decimal). The priority values are intelligently selected by the user based on various factors in order to establish a particular type of failover behavior and/or in order to rank the interfaces and routing devices. For example, a user may consider the amount of traffic (data) carried by each interface and assign priorities accordingly—an interface associated with a higher volume of traffic may be considered more important than an interface associated with a lower volume of traffic. In general, the priority of an interface reflects the relative importance of that interface, with importance being defined by the user.

A virtual router can be configured to span a number of physical routing devices such as the routing device 100. A priority value V is associated with the routing device 100 as well as with other physical routing devices that are part of the virtual router. Each physical routing device can have a different priority value. Each priority value is a user-specified value and, in one embodiment, may have value in the range of zero (0) to 255 (decimal). The physical routing device in the virtual router with the highest priority value is identified as the master for the virtual router, and other physical routing devices in the virtual router are identified as backups to the master.

The priorities of the physical routing devices can be set to reflect the relative importance of each of those devices. The relative priorities of the physical routing devices can also be set to establish failover behavior. For example, if the priority for the master router is substantially greater than that of the backup router with the next highest priority, then a number of ports may have to fail before failover occurs. On the other hand, if the priorities of the master and backup are relatively close to each other, then perhaps only a single failure is needed to trigger failover.

According to VRRP, when an interface on a physical routing device goes down (is out-of-service), then the priority of the physical routing device is changed to the priority associated with the out-of-service interface. For example, port 1 may be assigned a priority value of V1, port 2 may be assigned a priority value of V2, and so on, where V1 and V2 are each less than V. If all ports are functional, then the priority of the routing device 100 is V. If port 1 is out-of-service, then the priority of the routing device 100 is reduced to the value V1. If port 2 is out-of-service, then the priority of the routing device 100 is reduced to the value V2. If ports 1 and 2 are both out-of-service, then the priority of the routing device 100 is reduced to a third value that is less than both V1 and V2.

According to an enhanced or extended version of VRRP referred to as VRRPE, which is offered by Foundry Networks, Inc., of Santa Clara, Calif. (www.foundrynet.com), if an interface on a physical routing device is out-of-service, then the routing device's priority is decremented by a priority value associated with that interface. For example, if port 1 is assigned a priority value of V1, then if that port is out-of-service, the priority of the routing device 100 is reduced to V−V1 (V minus V1). If port 2 is out-of-service, and that port is assigned a priority value of V2, then the priority of the routing device 100 is reduced to V−V2. If ports 1 and 2 are both out-of-service, then the priority of the routing device 100 is reduced to V−V1−V2.

If the routing device 100 is the master and if its priority value is reduced to less that the priority value of the backup with the next highest priority value, then that backup becomes master. The physical routing devices in a virtual router communicate with each other using "hello messages" (also known as advertisements). One of the parameters contained in the hello messages is the master's current priority value. If the master's priority value changes, then the backups become quickly aware of the change and can automatically begin a negotiation to determine which backup will become the new master, by comparing their respective priority values.

Figure 2:
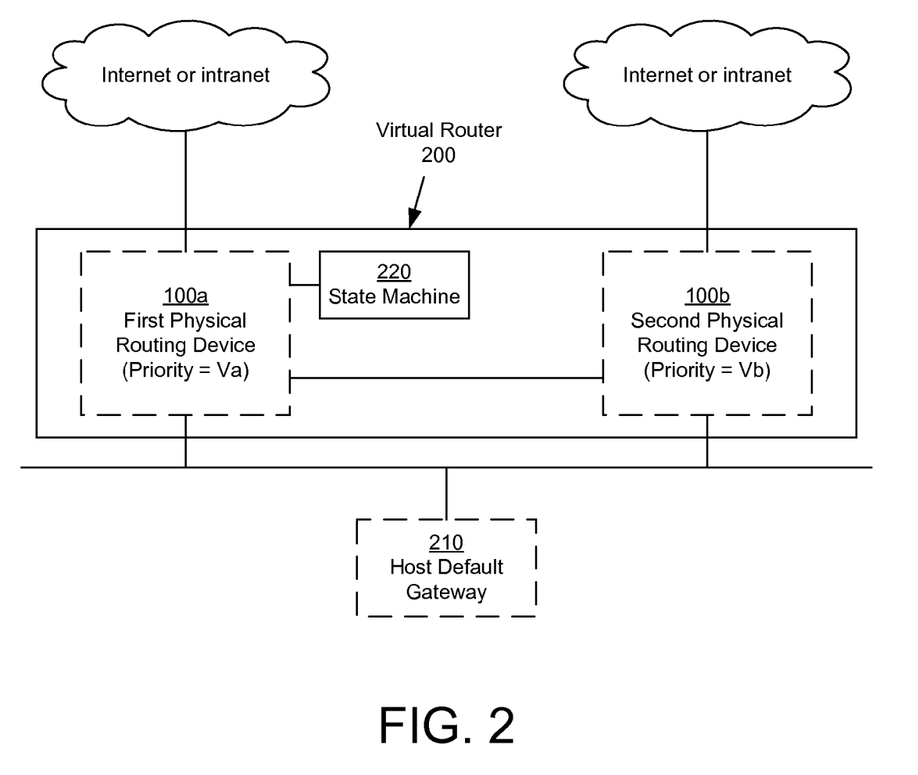
FIG. 2 is a block diagram showing a virtual router according to an embodiment of the present invention.

FIG. 2 is a block diagram showing a virtual router 200 according to an embodiment of the present invention. The virtual router 200 is an abstract representation that spans multiple physical routers. In the example of FIG. 2, the virtual router 200 spans physical routing devices 100*a* and 100*b*, each of which may be exemplified by the routing device 100 of FIG. 1. A virtual router may encompass more than two physical routers. A virtual router identifier (VRID) is associated with the physical routers comprising the virtual router. In the example of FIG. 2, both of the physical routing devices 100*a* and 100*b* are assigned the same VRID (the VRID for the virtual router 200).

Priority values Va and Vb are associated with the routing devices 100*a* and 100*b*, respectively. In the example of FIG. 2, the physical routing device 100*a* initially has the highest priority (Va is initially greater than Vb). Thus, for the purpose of handling network traffic for the host 210, the physical routing device 100*a* may be initially identified as the master, with the physical routing device 100*b* (along with any other physical routing devices spanned by the virtual router 200) acting as a backup. As master, the physical routing device 100*a* will answer pings, Address Resolution Protocol (ARP) requests, and so on. However, under certain circumstances described further below, a backup can assume the role of master if the priority of the master is reduced to a value less than that of the backup.

In general, an IP address is associated with the virtual router 200, and the host 210 points to the virtual router's IP address as its default gateway. According to VRRP, the virtual router 200 has an IP address that is one of the real or actual IP addresses of one of the physical routing devices comprising the virtual router. For example, an IP address for the physical routing device 100*a* can be used as the virtual router's IP address. According to VRRPE, the virtual router's IP address is user-configured and is in the same subnet as an interface configured on the virtual router, but cannot be the same as a real or actual IP address configured on the interface. According to both VRRP and VRRPE, if the master router (e.g., the routing device 100*a*) fails over to a backup, the virtual router's IP address does not change.

There may be multiple hosts serviced by the physical routing devices 100*a* and 100*b*. In that case, more than one virtual router may span the same group of physical routers, with each virtual router servicing some subset of the hosts. For example, two virtual routers may span the physical routing devices 100*a* and 100*b*, with one physical routing device acting as the master and the other physical routing device acting as backup for one virtual router and one set of hosts; the roles of the physical routing devices would be reversed for the other virtual router and another set of hosts. Thus, one physical routing device can be the master for one virtual router and a backup for another virtual router; however, one physical routing device cannot be the master for one subnet on a virtual router and backup for another subnet on the same virtual router.

The availability of each of the ports 1, 2, . . . , N can be monitored to determine whether or not each port is functioning properly. The monitoring function may be performed by the physical routing device on which the ports 1, 2, . . . , N reside, or it may be performed by another device (e.g., a centralized controller or management module, not shown) that is in communication with the various elements of the virtual router 200.

In general, the virtual router 200 is provided with the functionality to monitor the status of the interfaces on each of its physical routing devices and to reduce the priority value associated with each of those physical routing devices each time an interface is removed from service. More generally, the virtual router 200 is provided with the functionality to monitor the status of the various resources (including interfaces) provided by and available on each of the physical routing devices that comprise the virtual router. In addition to those already mentioned, resources can include, but are not limited to, computational resources such as available memory capacity and available CPU capacity. In general, the term "resources" is used herein to refer to computational resources and interfaces (e.g., ports) of a physical routing device, as well as other elements, either internal (local) to or external (remote) from the physical routing device, that can be monitored and measured and that can be factored into a calculation of the device's priority value.

The priority of a physical routing device (master or backup) can be adjusted up and down to track the availability of its resources. The effect of losing multiple interfaces and/or resource capacity can be cumulative. That is, for example, the loss of one interface on a physical routing device will reduce the priority value of that device by the priority value associated with that interface. In parallel with the loss of an interface, the priority value of the physical routing device may be further reduced according to the availability (e.g., remaining capacity) of its other resources (e.g., its remaining CPU capacity and/or memory capacity).

Failover—whereby the current or incumbent master (e.g., the physical routing device 100a) and one of the backups swap roles—can occur when the priority value of the master is reduced to less than the priority value of a backup (specifically, the backup with the highest priority value, e.g., the physical routing device 100b). For example, if port 1 is removed from service for some reason, then the priority of the master (the routing device 100a) is reduced to Va.' If Va' is less than Vb, then the routing device 100b may become master and the routing device 100a may become a backup, within the constraints of the failover protocol described below (see FIG. 3). Similarly, if port 1 is restored to service, then the priority of the routing device 100a increases to Va. Because Va is greater than Vb, the routing device 100a may again become master and the routing device 100b may again become a backup, within the constraints of the failover protocol described further below.

The virtual router 200 of FIG. 2 can also use the hello messages to determine if the master is still available. The backups wait for a period of time, referred to as the "dead interval," for a hello message from the master. If a backup does not receive the hello message within the dead interval, then it is presumed that the master is not available, and the backup with the highest priority value assumes the role of master.

Thus, there are at least two types of events that can trigger failover: the unavailability of resources that affect the priority value of the master, and the absence of a hello message from the master for a specified period of time.

According to embodiments of the present invention, a failover protocol that includes both a non-dampened state and a dampened state can be implemented. In one embodiment, the failover protocol is implemented using a state machine 220. In the example of FIG. 2, the state machine is shown as being coupled to the physical routing device 100a. In general, the state machine 220 may reside on the master, on one of the backups, or on another device (e.g., a centralized controller or management module, not shown) that is in communication with the various physical routers that comprise the virtual router 200.

According to the failover protocol, an attempt to designate one of the backups as master in place of the current master is permitted when the virtual router is in the non-dampened state, while such an attempt is suppressed when the virtual router is in the dampened state. More specifically, in one embodiment, a value of a metric (the "figure-of-merit") is increased in response to attempts to replace the current master with a backup. Depending on the value of the figure-of-merit, the failover attempt is either suppressed or not suppressed.

Figure 3:
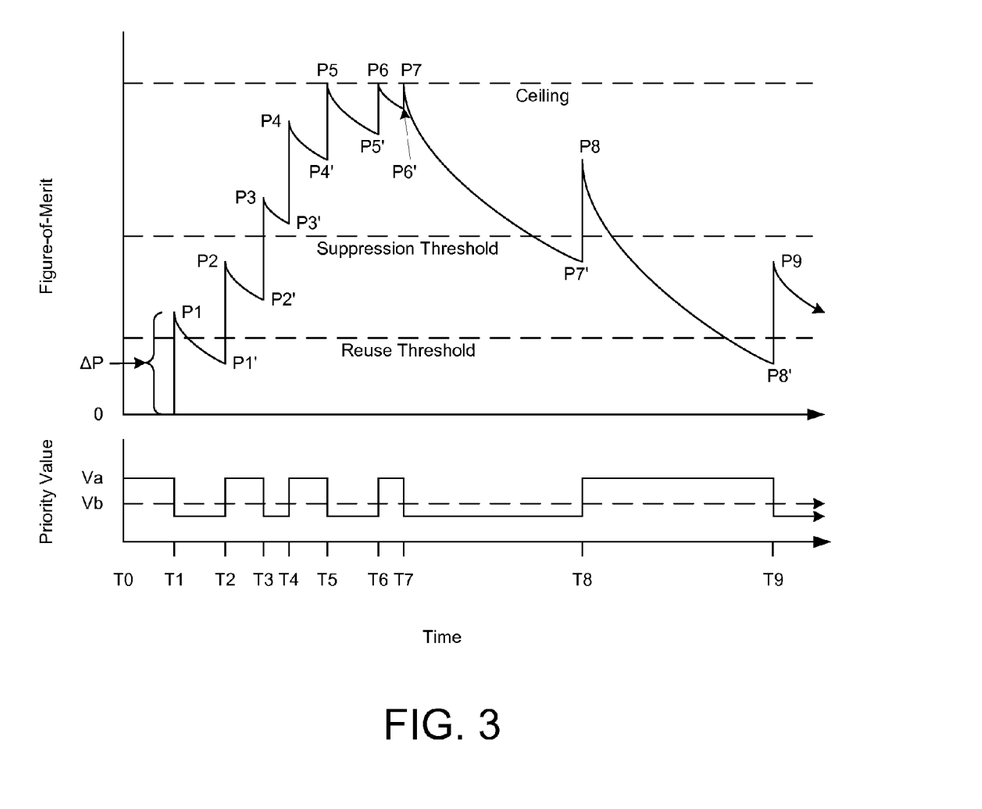
FIG. 3 illustrates a figure-of-merit versus time according to an embodiment of the present invention.

An embodiment of the failover protocol is described in conjunction with FIG. 3, which shows the figure-of-merit or metric P as a function of time in response to a series of events that can result in failover. The example of FIG. 3 is illustrative only and not necessarily to scale.

FIG. 3 also shows the values of Va (the priority value associated with the routing device 100a) and Vb (the priority value associated with the routing device 100b) as a function of time. In the example of FIG. 3, the value of Vb is shown as remaining constant, although that may not always be the case. The value of Vb can change as a result of a triggering event as described above. Furthermore, in the discussion below, the value of Va is described as changing as a result of a single event. However, as described above, there may be different events occurring in series or in parallel. Generally speaking, FIG. 3 shows the relative magnitudes of Va and Vb: Va can be less than Vb at some times, and at other times Vb can be less than Va.

In the FIG. 3 embodiment, a first (suppression) threshold and a second (reuse) threshold are specified. The first threshold is greater than the second threshold. Also, a ceiling or maximum value for the figure-of-merit is specified. Furthermore, an incremental amount (delta-P) is specified. Each of these parameters is a user-defined value that can be changed by the user to achieve a desired level of performance.

With reference to FIGS. 2 and 3, at some arbitrary time T0, the metric P has a value of zero (P0=0). At arbitrary time T1, a failover type of event occurs such that Va is reduced to a value that is less than Vb, causing the master (e.g., the routing device 100a) and a backup (e.g., the routing device 100b) to exchange roles as previously described herein. As a consequence of the event, the value of the metric P is increased by the incremental amount delta-P (P1=P0+delta-P). In the example of FIG. 3, the value P1 of the metric P at time T1 is still less than the first (suppression) threshold and therefore the next failover attempt would not be suppressed. After time T1, the value of the metric P decreases as a function of time to a value P1' at arbitrary time T2. In one embodiment, the value of the metric P decreases exponentially.

At time T2, the cause of the initial failover event is corrected such that Va is now greater than Vb, causing the incumbent master (the routing device 100b) to revert to a backup role, while the former master (the routing device 100a) reverts back to the role of master. For example, if the failover at time T1 occurred because an interface was lost and that interface is restored to service at time T2, then the priority value of the routing device 100a is increased back to its initial value Va (absent the occurrence of another failover event). In the example of FIG. 3, because the priority value Va associated with the routing device 100a is once again greater than the priority value Vb associated with the routing device 100b, the routing device 100a once again becomes master.

At time T2, the value P1' of the metric P is increased by the incremental amount delta-P (P2=P1'+delta-P). In the example of FIG. 3, the value P2 is still less than the first (suppression) threshold and therefore the next failover attempt would not be suppressed. After time T2, the value of the metric P decreases as a function of time (e.g., exponentially) to a value P2' at arbitrary time T3.

The scenario just described is repeated until the value of the metric P exceeds the first (suppression) threshold. The master and backup can continue to switch roles any number of times, depending on the value of the first threshold.

In the example of FIG. 3, at time T3, another failover type of event occurs, causing the incumbent master (the routing device 100a) to revert to a backup role, while the routing device 100b again assumes the role of master. The value P2' of the metric P at time T3 is increased by the incremental amount delta-P (P3=P2'+delta-P). In the example of FIG. 3, the value P3 is greater than the first (suppression) threshold but less than the ceiling. Consequently, subsequent failover attempts will be suppressed until the value of the metric P falls below the second (reuse) threshold or until a maximum suppression time is exceeded, as about to be described.

After time T3, the value of the metric P decreases as a function of time (e.g., exponentially) to a value P3' at arbitrary time T4. In the example of FIG. 3, the value P3' is still greater than the first (suppression) threshold and so the next failover attempt would be suppressed.

At time T4, the cause of the failover event at time T3 is corrected such that Va is now greater than Vb. Also, the value P3' of the metric P is increased by the incremental amount delta-P (P4=P3'+delta-P). In the example of FIG. 3, the value P4 is greater than the first (suppression) threshold but less than the ceiling. Accordingly, even though Va is greater than Vb, the incumbent master (e.g., the routing device 100b) remains master. That is, the failover attempt at time T4 is suppressed.

After time T4, the value of the metric P decreases as a function of time (e.g., exponentially) to a value P4' at arbitrary time T5. However, in the example of FIG. 3, the difference between the ceiling and the value P4' is less than delta-P. At time T5, another failover type of event occurs, such that Va is now less than Vb. Because P4' plus delta-P is greater than the ceiling, the value of the metric P is set to the ceiling value. That is, P5 is equal to the ceiling value. Regardless, the failover attempt is suppressed because the value P5 of the metric P is greater than the first threshold.

After time T5, the value of the metric P decreases as a function of time (e.g., exponentially) to a value of P5' at arbitrary time T6. At time T6, the cause of the failover event at time T5 is corrected such that Va is again greater than Vb. Because P5' plus delta-P is greater than the ceiling, the value of the metric P is set to the ceiling value (P6 is equal to the ceiling value). The failover attempt at time T6 is suppressed because the value of the metric P is greater than the suppression threshold.

After time T6, the value of the metric P decreases as a function of time (e.g., exponentially) to a value P6' at arbitrary time T7. At time T7, another failover type of event occurs, such that Va is again less than Vb. Because P6' plus delta-P is greater than the ceiling, the value of the metric P is set to the ceiling value (P7 is equal to the ceiling value). Again, the failover attempt is suppressed because the value P7 is greater than the first threshold.

After time T7, the value of the metric P decreases as a function of time (e.g., exponentially) to a value P7' at arbitrary time T8. At time T8, the cause of the failover event at time T7 is corrected such that Va is again greater than Vb. However, even though the value P7' is less than the first (suppression threshold), the failover attempt is suppressed because the value of the metric P has not yet reached the second (reuse) threshold.

After time T8, the value of the metric P decreases as a function of time (e.g., exponentially) to a value P8' at arbitrary time T9. In the example of FIG. 3, the value P8' is less than the reuse threshold, and so the virtual router 200 transitions back into the non-dampened state. At time T9, another failover type of event occurs, such that Va is again less than Vb. This failover attempt is not suppressed because the virtual router is 200 is now in the non-dampened state. Any subsequent failover attempts are not suppressed until the value of the metric P again reaches the first (suppression) threshold.

In one embodiment, a maximum suppression time is specified. If the virtual router 200 (FIG. 2) is in the dampened state for a period of time that is greater than the maximum suppression time, then the metric P is reset to a value of zero and the virtual router 200 is placed in the non-dampened state. Thus, in the example of FIG. 3, if T3–T9 (T3 minus T9) is greater than the maximum suppression time, then the metric P is reset to zero and failover attempts are not suppressed (until the suppression threshold is again exceeded). The maximum suppression time is a user-defined value that can be changed by the user to achieve a desired level of performance.

According to the embodiment of FIG. 3, the value of the metric P is allowed to increase and failover attempts are not suppressed up to the first (suppression) threshold. Once the first threshold is exceeded, failover attempts are suppressed. The value of the metric P may continue to increase but cannot exceed a maximum (ceiling) value. The value of the metric P decreases between failover attempts as a function of time. If the metric P decreases to a second (reuse) threshold, or if a maximum suppression time is exceeded (in which case the value of the metric P is set to zero), failover attempts are no longer suppressed, until the value of the metric P again reaches the first (suppression) threshold, and so on.

As a consequence, the number of times that the master and backup swap roles is reduced. In particular, if a virtual router experiences repeated and frequent events that normally trigger failover, then according to embodiments described herein, failover will be suppressed for some and perhaps most of those events. In other words, according to embodiments of the invention, an event that normally triggers failover will not always trigger failover, especially when the event is one of a series of relatively frequent events.

The example of FIG. 3 can be readily extended to other operating scenarios. For instance, after the second routing device 100b becomes master, one of its interfaces may flap, causing the priority value Vb of the routing device 100b to decrease below and then increase above the priority value Va of the routing device 100a. In a similar manner, after the second routing device 100b becomes master, one of its interfaces may flap, causing the priority value Vb of the routing device 100b to decrease below and then increase above the priority value of another backup routing device (not shown). To address these and similar scenarios, figures-of-merit can be independently maintained in parallel for each master-and-backup pairing.

As mentioned above, in one embodiment, the figure-of-merit (the metric P) decreases exponentially as a function of time between failover attempts. Such a function can be implemented using a "half-life" that specifies an amount of time (e.g., in seconds) after which the value of the metric P is decreased by one-half its current value. In one such embodiment, the ceiling is specified as a function of the maximum suppression time, reuse threshold and half life:

$$\text{ceiling} = \text{reuse-threshold} * (\exp(\text{max-suppress-time})/\text{half-life}) * \log(2)).$$

Figure 4:
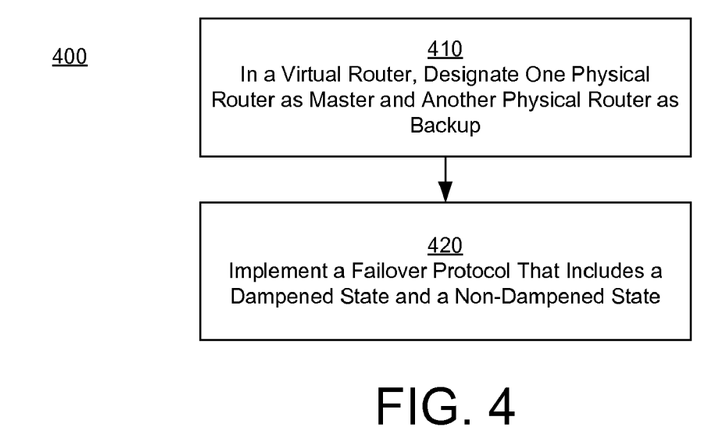
FIGS. 4 and 5 are flowcharts of computer-implemented methods for managing virtual routers in one embodiment in accordance with the present invention.
Figure 5:
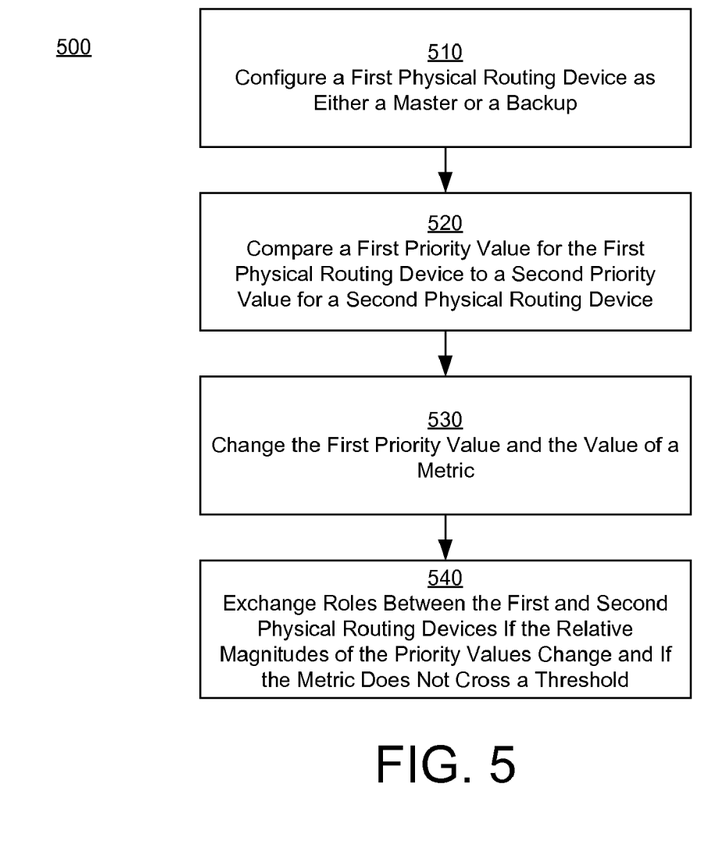

FIGS. 4 and 5 are flowcharts 400 and 500, respectively, of examples of computer-implemented methods (e.g., executed by a CPU operating on instructions retrieved from a storage medium such as a memory) for managing virtual routers in one embodiment in accordance with the present invention. Although specific steps are disclosed in the flowcharts, such steps are exemplary. That is, embodiments in accordance with the present invention are well-suited to performing various other steps or variations of the steps recited in the flowcharts. The steps in the flowcharts may be performed in an order different than presented.

In block 410 of FIG. 4, a virtual router that spans multiple physical routing devices is configured. In the virtual router, one of the physical routing devices is designated as master and the other physical routing devices are designated as backups.

In block 420, a failover protocol that includes a non-dampened state and a dampened state is implemented. In the non-dampened state, an attempt to designate one of the backups as master in place of an incumbent master is permitted; in the non-dampened state, the attempt is suppressed. In one embodiment, the failover protocol is implemented using a state machine 220 (FIG. 2) that selects either the dampened state or the non-dampened state depending on the value of a metric.

The value of the metric is increased each time there is a failover attempt and decreases as a function of time between failover attempts. In one embodiment, the virtual router enters the dampened state if the value of the metric exceeds a first (suppression) threshold value. In another embodiment, the value of the metric is allowed to increase to a defined maximum value (e.g., a ceiling). In yet another embodiment, the virtual router exits the dampened state and enters the non-dampened state after a prescribed period of time (e.g., the maximum suppression time), which begins after the value of the metric reaches the first threshold value. In another embodiment, the virtual router exits the dampened state if the value of the metric decreases to less than a second (reuse) threshold value.

In block 510 of FIG. 5, a first physical routing device that is part of a virtual router can be operated as either a master or as a backup.

In block 520, a first priority value for the first physical routing device is compared to a second priority value that is received from a second physical routing device that is also part of the virtual router. The second physical routing device has a role that is different from the role of the first physical routing device. That is, if the first physical routing device is operating as the master, then the second physical routing device is operating as a backup, and vice versa.

In block 530, the first priority value is changed when a precondition is met. In one embodiment, the state of a resource is monitored, and the first priority value is changed by an amount associated with the resource depending on whether the state of the resource satisfies the precondition. For example, the first priority value can be increased if a resource is restored (e.g., an interface is returned to service, or the availability of a computational resource is increased), and decreased if a resource is lost (e.g., an interface is out-of-service, or the availability of a computational resource is decreased). More specifically, as described previously herein, the status of the various resources (including interfaces) provided by and available on the first physical routing device can be monitored, and the priority of the physical routing device can be adjusted up and down to track the availability of those resources.

In block 540, the first physical routing device yields its current role (master or backup) to the second physical routing device and assumes the role (backup or master) of the second physical routing device, if the value of a metric does not cross (e.g., exceed) a first threshold and if the relative magnitudes of the first and second priority values are reversed as a result of the change to the first priority value (block 530). That is, for example, if the magnitude of the first priority value is initially less than the magnitude of the second priority value, but the magnitude of the first priority value increases to greater than that of the second priority value as a result of the change to the first priority value described by block 530, then the first and second physical routing devices may exchange roles, depending on how the value of the metric compares to the first threshold, as previously discussed herein. If the metric crosses (e.g., exceeds) the first threshold, then an attempt to exchange the roles of the first and second physical routing devices is suppressed even if the relative magnitudes of the first and second priority values are reversed, as previously discussed herein.

According to embodiments of the present invention, the number of times that the master and a backup swap roles is reduced. In particular, a flapping interface will not cause the master and backup to repeatedly swap roles. Consequently, the amount of dropped traffic is reduced.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A first physical routing device that is configurable as part of a virtual router and operable in a first role, said first physical routing device comprising:
   a central processing unit (CPU);
   a computer-readable medium having computer-executable instructions stored thereon, said instructions when executed by said CPU implementing a method of managing failover in said virtual router, said method comprising:
      comparing a first priority value for said first physical routing device to a second priority value for a second physical routing device that is also part of said virtual router, wherein said second physical routing device has a second role that is different from said first role;
      changing said first priority value and increasing a value of a metric in response to each occurrence of a triggering event, wherein said value of said metric decreases as a function of time; and
      yielding said first role to said second physical routing device and assuming said second role in place of said physical routing device if the relative magnitudes of said first and second priority value are reversed as a result of said changing and if said value of said metric does not cross a first threshold, wherein if said value of said metric crosses said first threshold then an attempt to exchange said first and second roles is suppressed even if the relative magnitudes of said first and second priority values are reversed.

2. The first physical routing device of claim 1 wherein said value of said metric cannot exceed a defined maximum value.

3. The first physical routing device of claim 1 wherein attempts to exchange said first and second roles are suppressed until said value of said metric decreases to less than a second threshold.

4. The first physical routing device of claim 1 wherein attempts to exchange said first and second roles are suppressed for a prescribed period of time that begins after said first threshold is crossed.

5. The first physical routing device of claim 1 wherein said method further comprises:
   monitoring a resource; and
   changing said first priority value by an amount associated with said resource if said resource is out-of-service.

6. The first physical routing device of claim 1 wherein said method further comprises:
   checking for a message from said second physical routing device if said second physical routing device is operating in a master role; and assuming said master role in place of said second physical routing device if said message is not detected for a specified period of time.

7. A non-transitory computer-readable medium having computer-executable code stored thereon for causing a first physical routing device to perform a method of managing failover in a virtual router that spans a plurality of physical routing devices, said method comprising:
  assuming a role as a master for said virtual router, wherein a role as a backup to said master is assigned to a second physical routing device that is also configurable to be part of said virtual router;
  changing a first priority value for said first physical routing device and increasing a value of a metric in response to each occurrence of a triggering event, wherein said value of said metric decreases as a function of time; and
  yielding said role as said master to said second physical routing device and assuming said role as said backup depending on the relative magnitudes of said first priority value and a second priority value for said second physical routing device and also depending on a value of said metric, wherein if said value of said metric is less than a first threshold value then said yielding said role as said master and said assuming said role as said backup are permitted and otherwise are suppressed.

8. The non-transitory computer-readable medium of claim 7 wherein attempts to switch said role as said master and said role as said backup are suppressed for a prescribed period of time after said value of said metric reaches said first threshold value.

9. The non-transitory computer-readable medium of claim 7 wherein if said value of said metric decreases to less than a second threshold value after reaching said first threshold value then attempts to replace said master are permitted to succeed.

10. The non-transitory computer-readable medium of claim 7 wherein said method further comprises:
  monitoring a state of a resource associated with said master;
  decreasing said first priority value by an amount associated with said resource if said state of said resource fails to satisfy a condition; and
  attempting to replace said master with said backup if said first priority value is less than said second priority value.

11. The non-transitory computer-readable medium of claim 7 wherein said method further comprises:
  checking for a message from said master; and
  attempting to replace said master with said backup if said message is not detected for a specified period of time.

12. A first routing device comprising:
  a central processing unit (CPU); and
  a computer-readable medium having computer-readable instructions stored therein that are executable by said CPU, said instructions being executable to:
    configure a virtual router that spans said first routing device and a second routing device, wherein said routing device is designated as a master for said virtual router and is designated as a backup if not designated as said master;
    change a first priority value for said first routing device and increase a value of a metric in response to each occurrence of a triggering event, wherein said value of said metric decreases as a function of time;
    perform a comparison of said first priority value to a second priority value for said second routing device; and
    comply with a failover protocol comprising a non-dampened state and a dampened state, wherein an attempt to designate said second routing device as said master in place of said first routing device is permitted while said routing device is operating in said non-dampened state and wherein said attempt is suppressed while said first routing device is operating in said dampened state, wherein said first routing device is in said dampened state if said first priority value is less than said second priority value and said value of said metric is greater than a first threshold.

13. The routing device of claim 12 wherein said value of said metric is allowed to increase to a defined maximum value.

14. The routing device of claim 12 wherein said attempt is permitted after a prescribed period of time that begins when said value of said metric reaches said first threshold value.

15. The routing device of claim 12 wherein said attempt is permitted if said value of said metric decreases to less than a second threshold value after reaching a first threshold value.

16. A physical routing device configurable as part of a virtual router and operable in a first role that is either a master role or a backup role, said physical routing device comprising:
  means for comparing a first priority value to a second priority value for a second physical routing device that is also part of said virtual router, wherein said second physical routing device has a second role that is different from said first role;
  means for changing said first priority value and increasing a value of a metric in response to each occurrence of a triggering event, wherein said value of said metric decreases as a function of time;
  means for yielding said first role to said second physical routing device; and
  means for assuming said second role in place of said second physical routing device, wherein said first role is yielded and said second role is assumed if the relative magnitudes of said first and second priority values are reversed as a result of changing said first priority value and if said value of said metric does not cross a first threshold, wherein if said metric crosses said threshold than an attempt to exchange said first and second roles is suppressed even if the relative magnitudes of said first and second priority values are reversed.

17. The physical routing device of claim 16 further comprising means for monitoring a resource, wherein said first priority value is changed by an amount associated with said resource depending on whether said state of said resource is out-of-service.

18. The physical routing device of claim 16 further comprising means for checking for a message from said second physical routing device if said second physical routing device is operating in said master role, wherein said master role is assumed if said message is not detected for a specified period of time.

* * * * *